O. A. THOMAS.
TRACK LEVELER ATTACHMENT FOR TRACTORS.
APPLICATION FILED MAY 28, 1919.
1,332,643.
Patented Mar. 2, 1920.
2 SHEETS—SHEET 2.
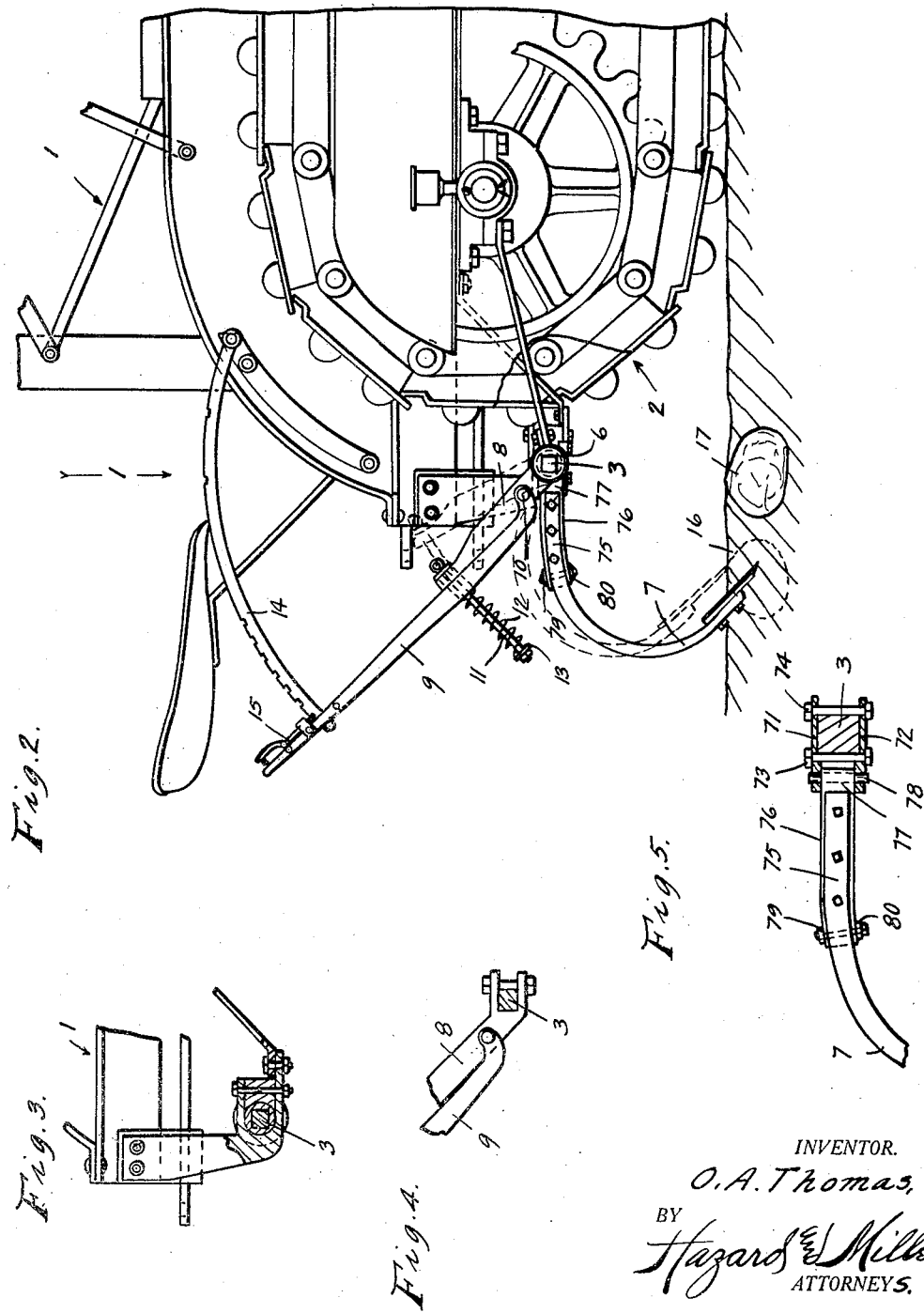

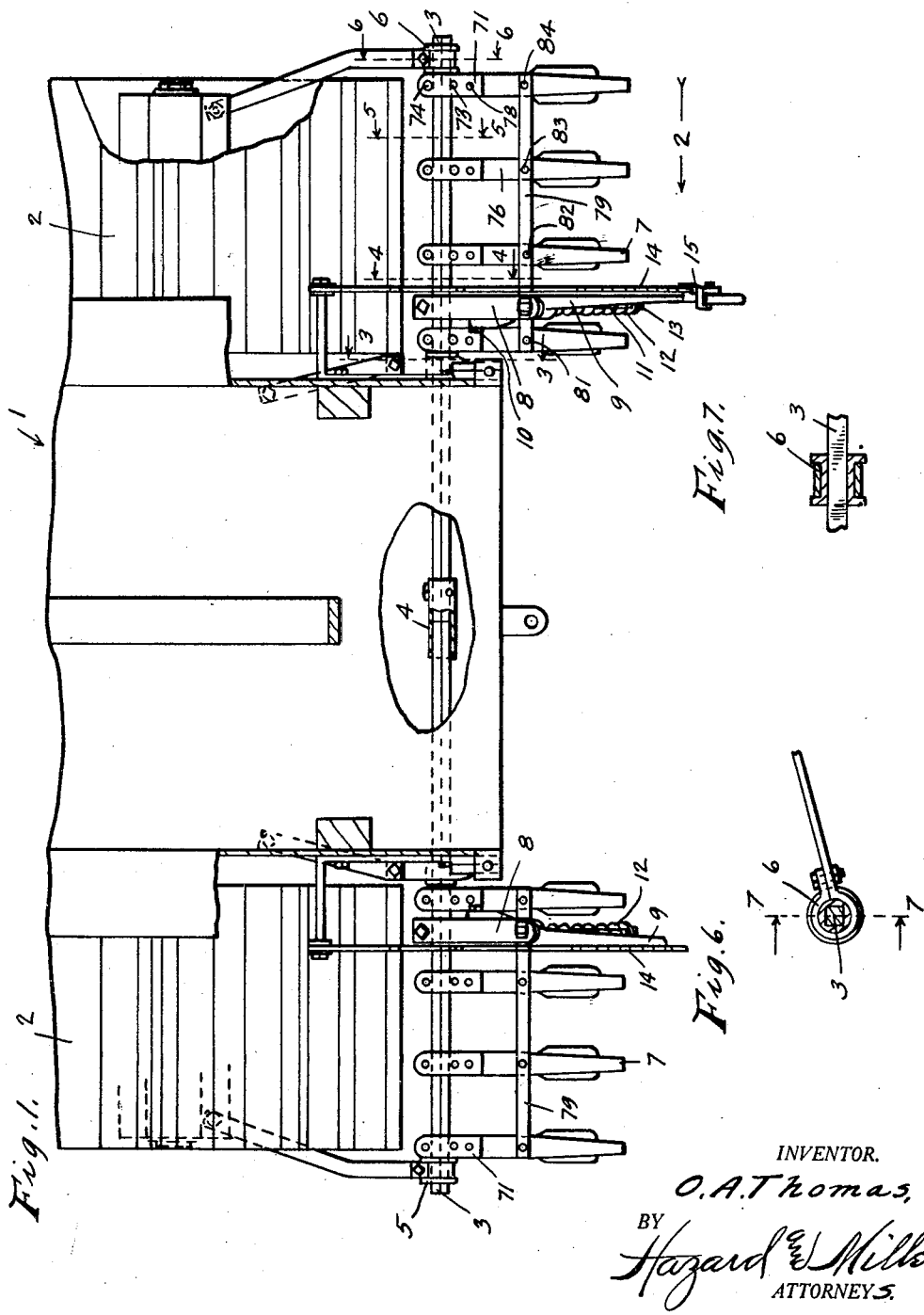

UNITED STATES PATENT OFFICE.

OSCAR ARTHUR THOMAS, OF OXNARD, CALIFORNIA.

TRACK-LEVELER ATTACHMENT FOR TRACTORS.

1,332,643.  Specification of Letters Patent.  Patented Mar. 2, 1920.

Application filed May 28, 1919. Serial No. 300,424.

*To all whom it may concern:*

Be it known that I, OSCAR ARTHUR THOMAS, a citizen of the United States, residing at Oxnard, in the county of Ventura and State of California, have invented new and useful Improvements in Track-Leveler Attachments for Tractors, of which the following is a specification.

My object is to make a track leveler attachment for tractors, and my invention consists of the novel features herein shown, described and claimed.

Specifically an object of my invention is to make a device for removing the tracks formed in a field by the caterpillars of a tractor so that after the field has been worked the surface will all be level and smooth instead of being deeply furrowed as is usual with the caterpillars.

Figure 1 is a fragmentary top plan view looking in the direction indicated by the arrow 1 in Fig. 2, parts being broken away and shown in section.

Fig. 2 is a fragmentary side elevation looking in the direction indicated by the arrow 2 in Fig. 1.

Fig. 3 is a fragmentary sectional detail on the line 3—3 of Fig. 1.

Fig. 4 is a fragmentary sectional detail on the line 4—4 of Fig. 1.

Fig. 5 is a fragmentary sectional detail on the line 5—5 of Fig. 1.

Fig. 6 is a fragmentary sectional detail on the line 6—6 of Fig. 1.

Fig. 7 is a cross sectional detail on the line 7—7 of Fig. 6.

The tractor 1 runs upon caterpillar treads 2 and the tractor is of considerable weight, and when the tractor runs across a plowed field the caterpillars leave deep tracks in the field, and it is the object of my attachment to dig up the tracks behind the caterpillars so as to leave the field unfurrowed after the work has been finished.

The shaft 3 is preferably made in two pieces connected by a joint 4 so that one end of the shaft may rotate independently of the other end. The shaft 3 is mounted in suitable bearings 5 and 6 with braces for holding the shaft in position directly across the machine behind the caterpillars 2 and slightly below the driving axle of the caterpillars. The cultivator teeth 7 are connected to the shaft 3, there being preferably a set of four teeth behind each caterpillar.

Referring to Figs. 1 and 5, the shaft 3 is square in cross section, plates 71 and 72 fit the top and bottom of the shaft 3 and are clamped in place by bolts 73 and 74. The cultivator tooth 7 has a shank 75 connected to the casting 76, and the casting 76 has a head 77 fitting between the projecting ends of the plates 71 and 72, and a pin 78 is fixed through the head 77, the ends of the pin being journaled in the ends of the plates 71 and 72, so that the cultivator teeth may swing laterally as when the caterpillar is turning. Connecting plates 79 and 80 are placed above and below the rear ends of the castings 76 and bolts 81, 82, 83 and 84 are inserted through the plates 29 and 80 and through the castings 76 and through the shank 75 to connect the four cultivator teeth together so as to space the cultivator teeth apart and so that the cultivator teeth will swing together.

An arm 8 is fixed upon the shaft 3, a hand lever 9 is connected to the arm 8 by a pin 10, said pin 10 being located near the shaft 3, a bolt 11 extends through the free end of the arm 8 and through the intermediate portion of the hand lever 9, an expansive coil spring 12 is placed upon the bolt, and a spring seat 13 is fixed upon the bolt against the spring to hold the spring against the hand lever 9, the tension of the spring being exerted to hold the hand lever 9 and the free end of the arm 8 together.

A long sector 14 is mounted in position to be engaged by the latch mechanism 15 carried by the hand lever 9. When the latch mechanism 15 is at the rear end of the sector 14, as in Fig. 2, the cultivator teeth 7 are set down into the ground 16 under the tension of the spring 12, and when a tooth strikes an obstruction 17 the spring 12 will yield and allow the cultivator teeth to swing backwardly and upwardly thereby swinging the arm 8 forwardly as shown in dotted lines. A hand lever and latch mechanism is provided for each end of the shaft 3, that is for each set of the cultivator teeth 7.

Of course, the mounting of the shaft 3 will have to be varied in detail for each distinct type of tractor to which the attachment is to be applied, and the specific details of these mountings are not considered essential, the only requirement being that the shaft 3 is suitably mounted to carry the cultivator teeth in position to do the work.

Various changes may be made without departing from the spirit of my invention as claimed.

I claim:

1. A track leveler attachment for tractors comprising a shaft adapted to be mounted behind a tractor, leveler teeth hingedly connected to the shaft, and a hand lever for the shaft for engaging the teeth with the ground.

2. A track leveler attachment for tractors comprising a shaft rotatably mounted behind a tractor, fittings fixed to the shaft for carrying leveler teeth arms, the leveler teeth arms carrying leveler teeth hingedly mounted in the fittings on the shaft to swing on a horizontal plane, a cross bar pivotally connecting all the arms so that they may all swing on a horizontal plane in unison and a lever for the shaft for operating the teeth vertically.

3. In a track leveler attachment for tractors, a shaft rotatably mounted, cultivator teeth fixed to the shaft, an arm fixed to the shaft, a hand lever pivoted to the arm intermediate of its ends, a bolt extending through the free end of the arm and through the intermediate part of the hand lever, a spring upon the bolt against the hand lever, a spring seat upon the bolt against the spring, a sector, and a latch mechanism upon the hand lever engaging the sector.

In testimony whereof I have signed my name to this specification.

OSCAR ARTHUR THOMAS.